United States Patent [19]
Narukawa et al.

[11] Patent Number: 5,834,133
[45] Date of Patent: Nov. 10, 1998

[54] LASER-SEALED BATTERY

[75] Inventors: Satoshi Narukawa; Syouzaburou Saji, both of Sumoto; Tooru Amazutsumi, Tsuna-gun; Yasuhiro Yamauchi, Sumoto; Hiyoshi Tamaki, Sumoto; Seiji Morita, Sumoto; Nobuaki Masaki, Sumoto, all of Japan

[73] Assignee: Sanyo Electric Co., Ltd., Osaka, Japan

[21] Appl. No.: 686,335

[22] Filed: Jul. 25, 1996

[30] Foreign Application Priority Data

| Jul. 28, 1995 | [JP] | Japan | 7-193625 |
| Oct. 16, 1995 | [JP] | Japan | 7-267100 |
| Mar. 11, 1996 | [JP] | Japan | 8-053032 |

[51] Int. Cl.$^6$ ............................ H01M 2/06; H01M 2/26
[52] U.S. Cl. .................. 429/171; 429/170; 429/169; 429/211
[58] Field of Search ................... 429/170, 171, 429/211, 169, 161, 94, 185, 233, 239

[56] References Cited

U.S. PATENT DOCUMENTS

| 4,663,248 | 5/1987 | Klein et al. | 429/170 |
| 4,761,352 | 8/1988 | Bakos et al. | 429/94 |
| 5,154,993 | 10/1992 | Beatty | 429/211 |
| 5,162,170 | 11/1992 | Miyabayashi et al. | 429/94 |
| 5,434,017 | 7/1995 | Berkowitz et al. | 429/94 |
| 5,443,925 | 8/1995 | Machida et al. | 429/94 |
| 5,585,206 | 12/1996 | Morris | 429/161 |

FOREIGN PATENT DOCUMENTS

| 59-12260 | 1/1984 | Japan | H01M 2/06 |

Primary Examiner—Stephen Kalafut
Assistant Examiner—Carol Chaney
Attorney, Agent, or Firm—Foley & Lardner

[57] ABSTRACT

A battery is provided which includes: an electrode roll having a positive-electrode plate, a negative-electrode plate and a separator interposed therebetween; a battery casing accommodating the electrode roll; and a sealing plate laser-welded to an open end of the battery casing. On the outermost periphery of the electrode roll is located an electrode-base-exposed portion of either one of the positive-electrode plate and the negative-electrode plate. The sealing plate is laser-welded to the battery casing in a state that a collector tab formed by incising the electrode-base-exposed portion and folding the incised portion is held between the periphery of the open end of the battery casing and the sealing plate. With this construction, the electrical connection between the collector tab and the battery casing is assuredly achieved simultaneously with the sealing of the battery to suppress a reduction in the closed-circuit voltage and an increase in the internal resistance. In addition, the battery of this construction can be fabricated by a simplified battery fabrication process.

26 Claims, 14 Drawing Sheets

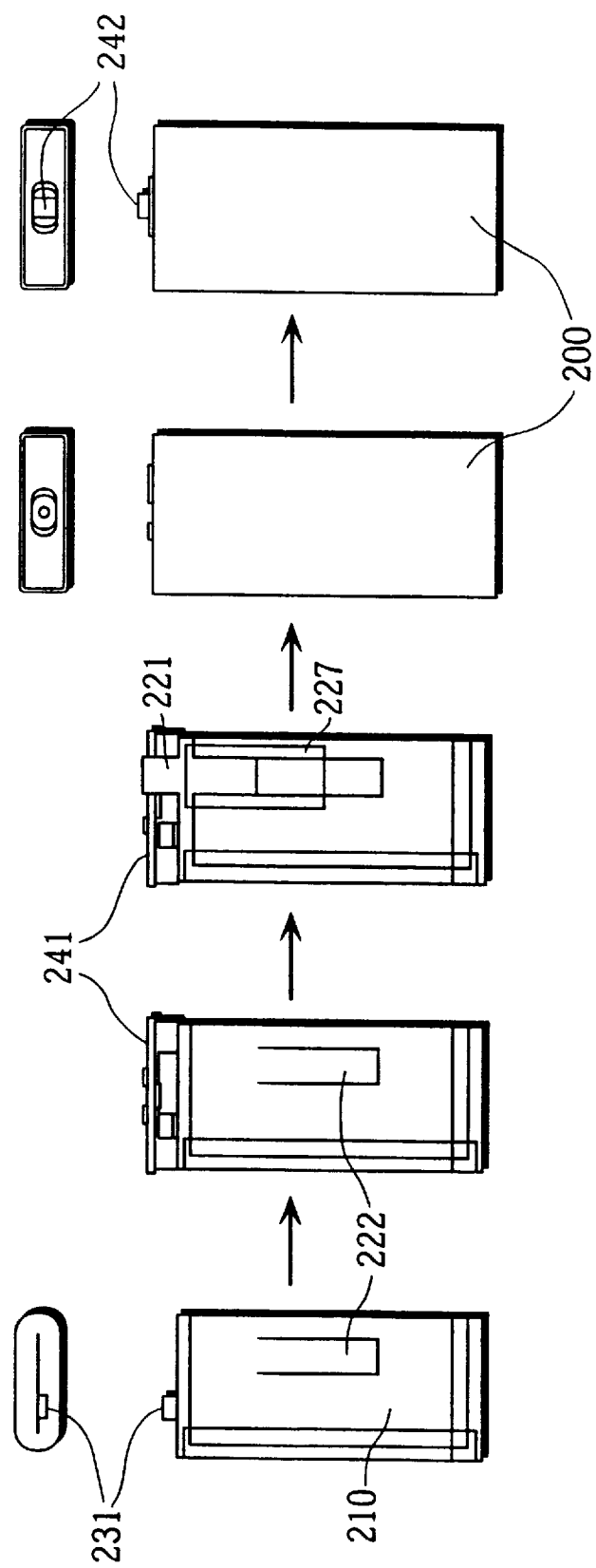

LASER-SEALED BATTERY

BACKGROUND OF THE INVENTION

1. Field of the Invention

The present invention relates to a laser-sealed battery having a sealing cover laser-welded to an open end of a battery casing accommodating power-generating components for sealing of the battery.

2. Description of the Prior Art

In a conventional fabrication method for a sealed battery, a positive-electrode collector tab is spot-welded to an internal surface of a battery casing also functioning as a positive-electrode external terminal, and a negative-electrode collector tab is spot-welded to a negative-electrode external terminal. However, this method involves a problem of complicated welding steps, because both the positive-electrode collector tab and the negative-electrode collector tab should be welded.

To cope with this problem, a fabrication method for a laser-sealed battery including an electrode roll is employed, which comprises the steps of: providing a positive-current collector-exposed portion retaining no active material on the outermost periphery of the electrode roll; bringing the positive-current collector-exposed portion into contact with the interior surface of a battery casing also functioning as a positive-electrode external terminal to electrically connect a positive electrode to the battery casing; and spot-welding a collector tab connected with a negative electrode to a negative-electrode external terminal.

However, if the battery is deformed, the degree of the contact between the positive-current collector-exposed portion and the battery casing is changed and, hence, a reliable current collecting performance cannot be ensured.

On the other hand, Japanese Unexamined Utility Model Publication No.59-12260 (1984) proposes a crimp-sealed battery in which a sealing cover is crimp-sealed to a battery casing with a collector tab terminal of one electrode being held between the battery casing and a gasket for insulating the sealing cover from the battery casing. Since the collector tab of the electrode is electrically connected to the battery casing simultaneously with the crimp-sealing of the sealing cover to the battery casing, the method dispenses with a welding step for the electrical connection.

However, the battery of this construction suffers from a reduced hermeticity of the crimp-sealed portion due to the intervention of the collector tab of the electrode and, therefore, leakage of an electrolyte from the crimp-sealed portion may result.

SUMMARY OF THE INVENTION

In order to solve the foregoing problems, it is an object of the present invention to provide a laser-sealed battery of a construction such that reliable electrical connection between a battery casing and a collector tab is ensured by a simplified collector-tab welding step.

In accordance with a first mode of the present invention to achieve the aforesaid object, there is provided a laser-sealed battery comprising: a battery casing having a hollow body with a bottom and an opening; a sealing cover having a sealing plate sealed to the opening of the battery casing; an electrode member accommodated in the battery casing, and including a positive-electrode plate having a conductive current collector retaining a positive-electrode active material, a negative-electrode plate having a conductive current collector retaining a negative-electrode active material, and a separator interposed between the positive-electrode plate and the negative-electrode plate; an electrolyte; and a first collector tab united with a first electrode plate serving as either one of the positive-electrode plate and the negative-electrode plate; the sealing plate being laser-welded to the battery casing with the first collector tab being held between an interior surface of the battery casing and the circumference of the sealing plate, whereby the first collector tab is electrically connected to the battery casing and the opening of the battery casing is sealed with the sealing plate.

The laser-sealed battery according to the first mode is characterized in that the sealing plate is laser-welded to the battery casing with the first collector tab being held between the periphery of the opening of the battery casing and the circumference of the sealing plate. The periphery and the current collector tab are melted together by the heat of the laser and united with each other in such a manner that these components are firmly combined with each other. Consequently the battery thus constructed has a high sealing performance and perfect electric connection between the current collector tab and the battery casing. When a battery having this structure is being manufactured, a current collector tab united with a pole of the battery (the first current collector tab) can be electrically connected with the battery casing which has another function as the external electrode terminal at the same time as sealing the opening of the battery. As a result, a welding process of connecting the current collector tab to the pole can be omitted. Further, the laser welding is performed with the first collector tab being held between the sealing plate and the battery casing, thereby ensuring firm connection of the first collector tab. This prevents an electrical connection failure. Unlike the conventional crimp-sealed battery (Japanese Unexamined Utility Model Publication No.59-12260), the sealing by the laser welding hardly causes a hermetic failure due to the intervention of the collector tab.

The reasons for this are as follows. According to the crimp sealing, an end of the battery casing is bent so that a mechanical pressure is applied on the surface of the battery casing, thereby sealing the battery; however, such a mechanical pressure is likely to grow weak with time. Also, a current collector tab having a smaller width than the periphery of the battery casing is crimped; gaps are likely to be caused between the portion including the current collector tab and the portion not including the current collector tab. In the battery of the present invention, these gaps are filled with melted material, so that a finished battery has a complete sealing performance. In the first mode, usable as the electrode member is an electrode roll which is formed by rolling the positive-electrode plate and the negative-electrode plate with the separator interposed therebetween. Where the electrode roll is employed as the electrode member, it is preferred that: a rolling-terminal portion of the first electrode plate is located on the outermost periphery of the electrode roll; at least a surface portion of the first electrode plate on the outermost periphery facing opposite to the interior surface of the battery casing retains no active material and serves as a current collector-exposed portion retaining no active material; the first collector tab is provided on the current collector-exposed portion; and all or a part of the current collector-exposed portion is brought in contact with the interior surface of the battery casing.

With this arrangement, a large opposing area between the positive-electrode plate and the negative-electrode plate can be provided, thereby offering a higher battery capacity per unit volume. Further, the provision of the first collector tab on the outermost periphery of the electrode roll permits the collector tab to be linearly extended along the interior surface of the battery casing to the open end thereof. This prevents an internal short-circuit which may otherwise occur when the collector tab contacts a member having a polarity different from that of the collector tab.

With this arrangement, current collection is achieved by means of the collector tab laser-welded between the opening end of the battery casing and the sealing plate and by the contact between the current collector-exposed portion and the interior surface of the battery casing. Thus, reliable current collection is ensured, and the battery is free from a reduction in the closed-circuit voltage and an increase in the internal resistance which may otherwise occur due to an electrical connection failure.

A conventional battery adapted to achieve current collection only by the contact between the outermost periphery of one electrode and an interior surface of a battery casing exhibits an unreliable current collection performance, because the degree of the contact between the outermost periphery of the electrode and the interior surface of the battery casing is reduced if the battery casing is deformed by a shock when the battery is dropped or if the battery casing is expanded due to a temperature rise of the battery (or an increase in the internal pressure of the battery).

The first collector tab is preferably formed by incising the current collector-exposed portion of the first electrode plate located on the outermost periphery of the electrode roll and folding the incised portion to the side of the sealing plate. The current collector tab, which is thus formed as an integral part of the current collector, is unlikely to cause electric connection failure with the current collector even when a shock is applied from outside on the finished battery. Consequently, a highly reliable battery can be manufactured. Furthermore, in the manufacture of the battery, a process of spot-welding the current collector tab to either pole of the battery becomes unnecessary, which accordingly simplifies the manufacturing process. To the contrary, a conventional battery having a separately spot-welded collector tab has a problem that when an external pressure is applied on a finished battery in such a case that the battery is dropped on the floor, the electric connection is likely to be damaged.

Where the collector tab formed by folding the incised portion of the current collector-exposed portion is employed, the first electrode plate (having the same polarity as the current collector-exposed portion) or the electrode-base-exposed portion of the first electrode plate retaining no active material preferably underlies the incised and folded portion of the current collector-exposed portion (or is located on the side of a roll axis) with or without the intervention of the separator. This arrangement is based on the following consideration.

When an incision is formed as extending through the current collector by means of a knife or the like, burrs are formed along the incision. If a counter electrode (an electrode plate having a polarity different from that of the first electrode plate, and hereinafter referred to as "second electrode plate") underlies the incised portion of the current collector-exposed portion with the intervention of the separator, the burrs having sharp edges may cut through the separator and come into contact with the second electrode, thereby causing an internal short-circuit. However, by locating the first electrode plate having the same polarity or the current collector-exposed portion of the first electrode plate below the incised portion, the internal short-circuit can be prevented even if the burrs penetrate through the separator.

The incised portion may have any of various configurations, but is preferably generally U-shaped. It is easy to fold the U-shaped incised portion for the formation of the collector tab. Further, the collector tab thus formed has a uniform strength and electrical resistance.

The incised portion more preferably has the following configuration. That is, the incised portion is defined by at least two opposing incision lines and a folding line defined between ends of the two incision lines on the side of the sealing plate and extending generally parallel to the rolling direction of the electrode roll, and one of the two incision lines on a side to be first rolled up for the formation of the electrode roll is inclined to the rolling direction from an intersection of the one incision line and the folding line. This arrangement is based on the following consideration.

As described above, the collector tab is formed by folding the incised portion of the current collector-exposed portion along the folding line. Because of a counter force against the folding initially applied to the collector tab, the collector tab is liable to be raised from the surface of the current collector-exposed portion (or to assume an unstably standing attitude). The counter force is enhanced when the electrode plates are rolled up. Therefore, the collector tab, if having two opposing edges each extending perpendicular to the rolling direction, is more liable to be raised to deform when the electrode plates are rolled into the electrode roll or when the electrode roll is shaped into a non-cylindrical configuration after the roll-up thereof. To the contrary, where the collector tab is configured such that an edge of the collector tab on the side to be first rolled up is inclined to the rolling direction from the folding line (base line for folding), the counter force causing the collector tab to rise is reduced in comparison with a collector tab having the two opposing edges each extending perpendicular to the rolling direction. The collector tab is rolled from the proximal end thereof and, hence, the deformation of the collector tab is alleviated. In addition, since the electrode roll can be more smoothly inserted into the battery casing, a damage to the collector tab at the insertion can be reduced.

In the first mode of the present invention, the respective components are arranged as follows. The battery casing and the current collector of the first electrode plate are preferably formed of aluminum or an aluminum alloy. The electrode roll preferably has an elliptical (not circular) configuration in section taken along a line perpendicular to a roll axis of the electrode roll. The battery casing preferably has a rectangular or elliptical configuration in open end section.

In the first mode, the first electrode plate is electrically connected to the battery casing by bringing the current collector-exposed portion of first electrode plate on the outermost periphery of the electrode roll into contact to the interior surface of the battery casing, and the collector tab of the first electrode plate is formed by incising and folding part of the current collector-exposed portion. Therefore, the current collector of the first electrode plate is preferably formed of a material which is easy to incise and excellent in the conductivity. Aluminum and an aluminum alloy satisfy these requirements, and are excellent in the corrosion resistance and less expensive. These materials are particularly suitable for use in a nonaqueous electrolyte battery providing a high battery voltage.

The battery with the battery casing having a four-sided, particularly rectangular, or elliptical sectional outline can readily be accommodated in an electronic apparatus having a limited battery accommodating space. Where the sectional outline of the battery casing is four-sided, the electrode roll incorporated therein is preferably elliptical in section taken along the line perpendicular to the roll axis of the electrode roll. This allows the battery to have a reduced size.

Next, a second mode of the present invention will be described. In accordance with the second mode, a sealing cover having a spacer of a novel structure is employed in the laser-sealed battery of the first mode. The sealing cover of the novel structure includes a sealing plate, an insulating plate disposed on the under surface of the sealing plate, a collector terminal plate (having a polarity different from that of the first electrode plate) disposed on the under surface of the insulating plate, and a spacer molded integrally with the insulating plate. The spacer has a wall portion for preventing electrical contact between the aforesaid first collector tab and members having the polarity different from that of the first collector tab. This arrangement is based on the following consideration.

In a laser-sealed battery of a type in which a battery casing serves as an external terminal of one electrode, a battery cap (part of the sealing cover) projecting outwardly serves as an external terminal of the other electrode, and is electrically connected to a collector terminal plate and the other electrode via a lead. More specifically, the collector terminal plate electrically connected to the battery cap is fixed onto the under surface of a sealing plate with an insulating plate interposed therebetween. One end of the lead is spot-welded to the collector terminal plate, while the other end thereof is connected to the other electrode. The collector tab of the one electrode is extended to a portion where the sealing plate is fitted in the battery casing, and held between the circumference of the sealing plate and the interior surface of the battery casing.

The collector tab of the one electrode is disposed adjacent to the collector terminal plate and the lead within the battery casing. Therefore, when an external shock (e.g., a shock produced by the dropping of the battery) is applied to the battery having members of different polarities disposed adjacent to each other, there is a possibility that the members of different polarities are brought in contact with each other due to the displacement of the electrode roll or the deformation of the collector tab of the one electrode or the lead.

On the contrary, the second mode employs the construction such that the spacer having the wall portion molded integrally with the insulating plate for preventing the first collector tab from contacting the collector terminal plate and the lead is provided between the sealing cover and the electrode roll. Therefore, the wall portion functions to prevent the electrical connection between the members of different polarities and the internal short-circuit due to an external shock.

BRIEF DESCRIPTION OF THE DRAWINGS

FIG. 8 is explanatory diagrams illustrating a fabrication process for the battery A2;

DESCRIPTION OF THE PREFERRED EMBODIMENTS

The present invention will hereinafter be described by way of Examples thereof.

Example 1

Figure 1:
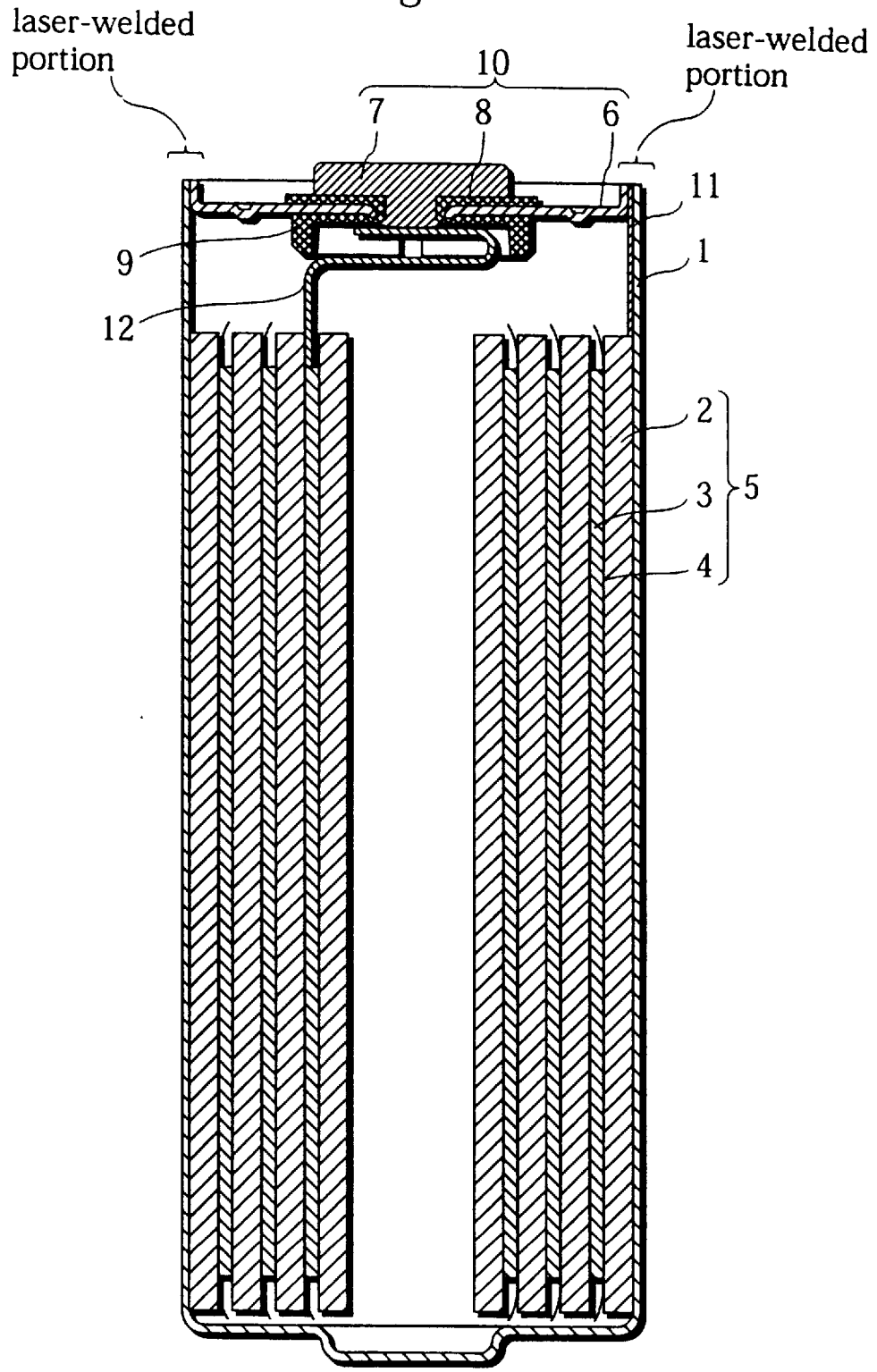
FIG. 1 is a schematic sectional view of a battery A1 according to the present invention.

In Example 1, the present invention is applied to a lithium battery. The battery A1 will be described with reference to FIG. 1. In FIG. 1, there is shown the battery A1 which comprises a battery casing 1 having a hollow body with an opening at its top and a bottom, and power-generating components such as a positive-electrode plate 2, a negative-electrode plate 3, a separator 4 and an electrolyte, which are housed in the battery casing 1. The battery casing 1 is formed of a conductive material such as a cold-rolled steel plate, and also functions as an external electrode terminal (positive-electrode external terminal) of the first electrode (positive-electrode plate in FIG. 1).

The positive-electrode plate 2 includes an current collector formed of a conductive metallic material such as aluminum or an aluminum alloy, and positive-electrode active material layers formed on opposite surfaces of the current collector and containing manganese dioxide as a principal component thereof.

The negative-electrode plate 3 is essentially formed of lithium. A negative-electrode collector tab 12 is attached to an upper portion of the negative-electrode plate 3.

The separator 4 is interposed between the positive-electrode plate 2 and the negative-electrode plate 3. The separator 4 is formed of polyethylene.

The positive-electrode plate 2 and the negative-electrode plate 3 are rolled into a spiral configuration with the separator 4 interposed therebetween to form an electrode roll 5. A portion of the positive-electrode plate 2 located on the outermost periphery of the electrode roll is not formed with the positive-electrode active material layers, serving as a current collector-exposed portion. A positive-electrode collector tab 11 is spot-welded to the current collector-exposed portion.

A sealing cover 10 includes a sealing plate 6, a negative-electrode external terminal member 7, a gasket 8 and an insulating plate 9.

The sealing plate 6 has a through-hole formed in the central portion thereof. The sealing plate 6 is generally formed of the same material (e.g., cold-rolled steel plate) as the battery casing 1.

The gasket 8 which is electrically insulative is interposed between the through-hole of the sealing plate 6 and the negative-electrode external terminal member 7 for electrical insulation therebetween and for prevention of liquid leakage and gas leakage. It should be noted that, if the negative-electrode plate serves as the first electrode plate, the terminal member 7 serves as a positive-electrode external terminal.

The insulating plate 9 is formed of an electrically insulative material such as a polypropylene resin or a polyethylene resin. The insulating plate 9 serves to prevent components having different polarities from contacting each other.

As described above, the positive-electrode collector tab 11 and the negative-electrode collector tab 12 are formed with the positive-electrode plate 2 and the negative-electrode plate 3, respectively.

The laser-sealed battery A1 of Example 1 was fabricated in the following manner by using the aforesaid components.

First, the gasket 8 and the insulating plate 9 were fitted in the through-hole of the sealing plate 6 to cover the side wall and peripheral portion of the through-hole, and the negative-electrode external terminal member 7 was inserted into the through-hole and fixed therein. Thus, the sealing plate 10 was completed. In turn, the negative-electrode collector tab 12 formed with the upper portion of the negative-electrode plate 3 was spot-welded to an under face of the negative-electrode external terminal member 7. Thereafter, the electrode roll 5 was inserted into the battery casing 1, and the electrolyte was poured therein. The electrolyte contained 0.55 mol/l $LiCF_3SO_3$ dissolved in a solvent mixture containing ethylene carbonate, butylene carbonate and dimethoxyethane in a ratio of 40:40:20.

The positive-electrode collector tab 11 attached to the upper portion of the positive-electrode plate 2 of the electrode roll 5 was linearly extended along the interior surface of the battery casing 1 to the open end thereof. The sealing plate 10 was fitted in the opening of the battery casing 1 with the extended end portion of the positive-electrode collector tab 11 being held between the open end of the battery casing 1 and the sealing plate 6, and then the portion where the sealing plate 6 was fitted in the battery casing 1 was laser-welded, whereby the opening of the battery casing was completely sealed and, at the same time, the positive-electrode collector tab 11 was electrically connected to the battery casing 1 also functioning as the positive-electrode external terminal. Thus, the battery A1 of Example 1 was completed.

Comparative Example 1

Figure 2:
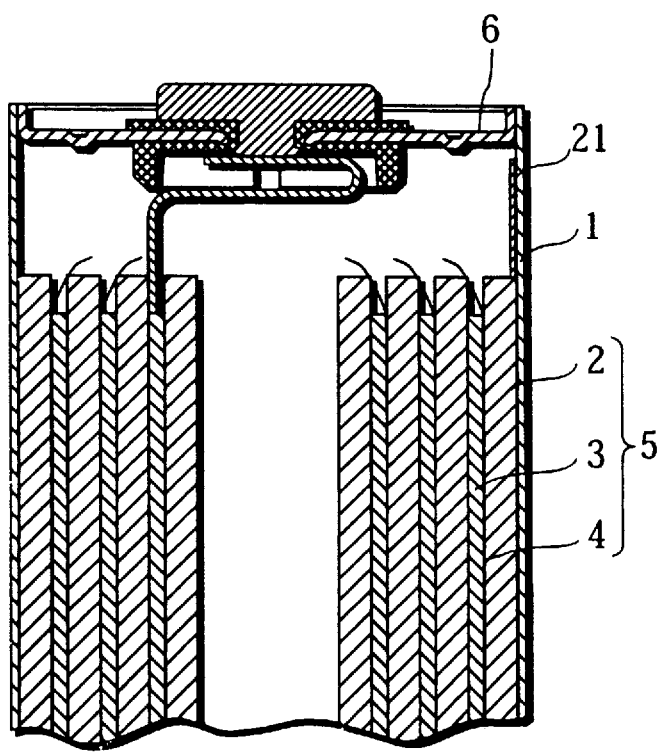
FIG. 2 is a schematic sectional view of a battery B1 according to a comparative example of the present invention.

A battery B1 shown in FIG. 2 was fabricated, which had substantially the same construction as the battery A1 of Example 1 except that the positive-electrode collector tab 21 was not extended to the open end of the battery casing 1 but spot-welded to the interior wall of the battery casing 1 at one point.

[Experiment 1-1]

The incidence of defectives and the process maintenance time were measured during the fabrication processes of the battery A1 and the battery B1. The results are shown in Table 1-1. Table 1-1 shows a comparison between the battery A1 and the battery B1, which is expressed by a defective index and a maintenance time index with the measurements for the battery B1 used as a base (100).

The incidence of defectives herein means the incidence of failures in the electrical contact between the positive-electrode collector tab and the battery casing. The maintenance time herein means a cumulative time period during which the fabrication line was temporarily stopped for process maintenance. The process maintenance is essential to ensure normal operations in the respective process steps.

TABLE 1-1

|  | Battery A1(Ex.1) | Battery B1(Com.Ex.1) |
|---|---|---|
| Incidence of defectives | 80 | 100 |
| Process maintenance time | 80 | 100 |

As can be seen from Table 1-1, the incidence of defectives for the battery A1 was lower than that for the battery B1, and the fabrication process for the battery A1 required a less maintenance time. This is because the fabrication process for the battery A1 does not require the step of spot-welding the positive-electrode collector tab to the interior surface of the battery casing. More specifically, in the fabrication process for the battery B1, it is difficult to precisely spot-weld the positive-electrode collector tab to the interior surface of the battery casing because the positive-electrode collector tab is located in a position inward from the open end of the battery casing, i.e., in a hard-to-see position. Therefore, the yield is reduced due to the welding failure. Further, the spot welding requires a periodical replacement of a spot-welding rod, thereby requiring a greater maintenance time.

On the other hand, since the fabrication process for the battery A1 does not require the step of spot-welding the positive-electrode collector tab to the interior surface of the battery casing, the aforesaid problems (defectives due to welding failure and replacement of the welding rod) associated with the fabrication process for the battery B1 can be eliminated. The battery A1 according to the present invention can be produced at a higher throughput and at a lower defective rate than the battery B1. Thus, a highly reliable laser-sealed battery can be provided at a lower cost.

[Experiment 1-2]

For a drop shock test, 1,000 batteries A1 and 1,000 batteries B1 were prepared in the above-mentioned manner. These batteries were each dropped from a height of 3 m onto a concrete floor twenty times, and then disassembled for inspection of the portion where the positive-electrode collector tab was welded to the battery casing. The results are shown in Table 1-2, in which the number of batteries having a disconnection of the positive-electrode collector tab from the battery casing is shown.

TABLE 1-2

|  | Battery A1(Ex.1) | Battery B1(Com.Ex.1) |
|---|---|---|
| Number of batteries with disconnection | 0/1,000 | 8/1,000 |

As can be seen from Table 1-2, disconnection of the welded portion was observed at a ratio of 8/1,000 for the battery B1, while no disconnection was observed for the battery A1 (ratio of 0/1,000). The results of this experiment indicates that the battery A1 of the present invention which was fabricated by laser-sealing the sealing plate to the battery casing with the collector tab held therebetween exhibited a more reliable current-collecting performance than the battery B1 of Comparative Example 1.

Example 2

Example 2 is different from Example 1 in that the present invention is applied to a lithium ion battery and the positive-electrode collector tab is formed by incising and folding a part of the positive-current collector. The battery A2 according to Example 2 will hereinafter be described with reference to FIGS. 3 to 8.

Figure 3:
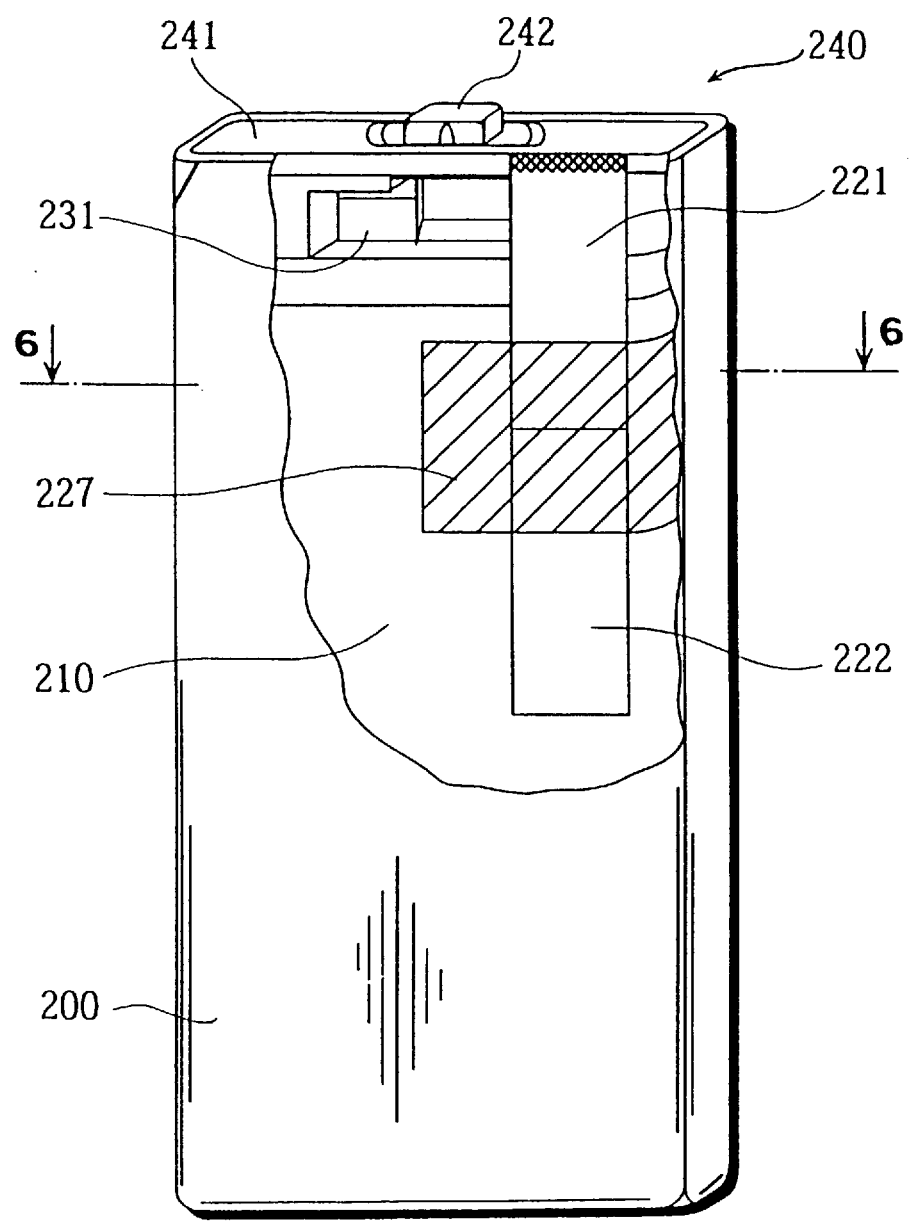
FIG. 3 is a partially cut-away perspective view of a battery A2 according to the present invention.

FIG. 3 is a perspective view illustrating a major portion of the battery A2. Referring thereto, a brief description will be given to the battery A2. Like the battery A1, the battery A2 includes an electrode roll 210 having a positive-electrode plate and a negative-electrode plate rolled with a separator interposed therebetween, and a battery casing 200 accommodating the electrode roll 210 and also functioning as a positive-electrode external terminal. A sealing plate 241 is sealed to an upper open end of the battery casing 200 by laser welding in such a state that an end portion of a positive-electrode collector tab 221 formed with the positive-electrode plate (220) is held between the circumference of the sealing plate 241 and the upper open end of the battery casing 200. Like the battery A1, the battery A2 has a construction such that the positive-electrode collector tab 221 is electrically connected to the battery casing 200 simultaneously with the welding of the sealing plate 241 to the battery casing 200.

An explanation will hereinafter be given to a fabrication process for the battery A2 to show structural features of the battery A2.

[Preparation of positive-electrode plate]

Figure 4:
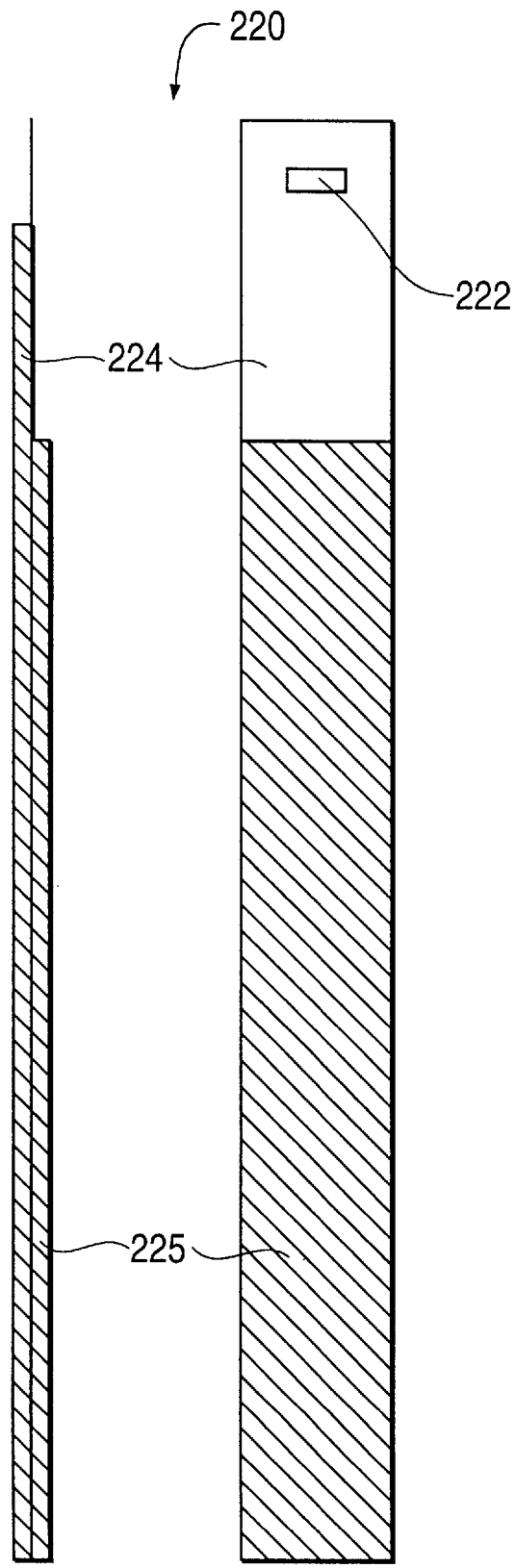
FIG. 4 is a side view (left) and a front view (right) illustrating a positive-electrode plate of the battery A2.

FIG. 4 illustrates the construction of the positive-electrode plate. In FIG. 4, a side view and a front view of the positive-electrode plate are shown at the left and at the right, respectively. The positive-electrode plate 220 is prepared in the following manner.

First, a positive-electrode material is prepared by fully mixing 85 parts by weight of $LiCoO_2$, 5 parts by weight of artificial powdery graphite and 5 parts by weight of carbon black. A positive-electrode slurry is prepared by mixing the positive-electrode material with N-methyl-2-pyrrolidone containing 5 parts by weight (solid component) of polyvinylidene fluoride (PVdF).

The positive-electrode slurry is applied on opposite sides of a positive-current collector 224 of aluminum having a length of 335 mm, a width of 38 mm and a thickness of 20 $\mu$m to form positive-electrode active material layers 225 on the positive-current collector 224. The resulting positive-current collector is dried, then pressed by means of a roller press, and further dried in vacuo at 110 $\beta C$ for three hours. Thus, the positive-electrode plate 220 is prepared.

For the preparation of the positive-electrode plate 220, a 20 mm-long rolling-terminal portion of the positive-current collector is not formed with the positive-electrode active material layers on either of the opposite sides thereof, thereby serving as a two-side current collector-exposed portion. A 50 mm-long portion of the positive-current collector extending from an end of the two-side current collector-exposed portion to the side of a rolling-starting end is formed with a positive-electrode active material layer only on one side thereof, thereby serving as a one-side current collector-exposed portion with the other side thereof being exposed.

A U-shaped incised portion 222 defined by three incision lines extending through the positive-current collector is formed in the two-side current collector-exposed portion. The incised portion 222 is formed by cutting the current collector by means of a sharp cutting tool, and thereafter folded for formation of the collector tab 221.

[Preparation of negative-electrode plate]

Figure 5:
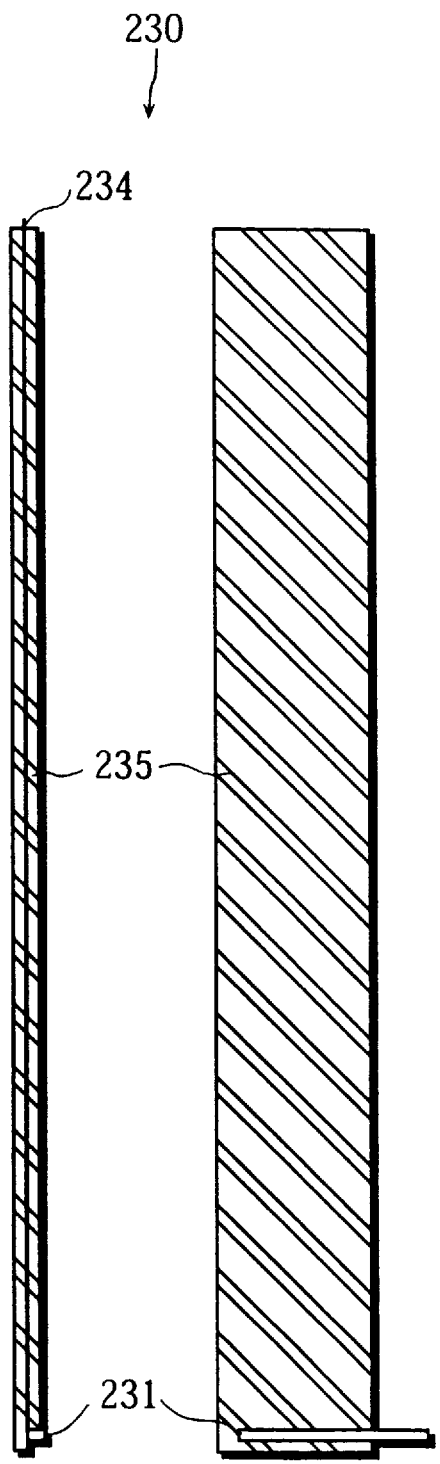
FIG. 5 is a side view (left) and a front view (right) illustrating a negative-electrode plate of the battery A2.

FIG. 5 illustrates the construction of the negative-electrode plate. In FIG. 5, a side view and a front view of the negative-electrode plate are shown at the left and at the right, respectively. The negative-electrode plate 230 is prepared in the following manner.

A negative-electrode slurry is prepared by mixing 95 parts by weight of natural powdery graphite (negative-electrode material) having particle diameters of 5 $\mu$m to 25 $\mu$m with N-methyl-2-pyrrolidone containing 5 parts by weight of PVdF.

The negative-electrode slurry is applied on opposite sides of a negative-current collector 234 of a copper film having a length of 315 mm, a width of 39 mm and a thickness of 18 $\mu$m to form negative-electrode active material layers on the negative-current collector 234, which are thereafter dried. In turn, the resulting negative-current collector is pressed by means of a roller press. A portion of the negative-electrode active material layer formed on a rolling-starting portion of the negative-current collector is removed, and a lead (negative-electrode collector tab 231) of nickel is spot-welded to the rolling-starting portion. Then, the resulting negative current collector is dried in vacuo at 110 $\beta C$ for three hours. Thus, the negative-electrode plate 230 is prepared.

[Preparation of electrolyte]

A nonaqueous electrolyte is prepared by dissolving 1 mol/l $LiPF_6$ in a solvent mixture containing ethylene carbonate and diethyl carbonate in a volume ratio of 40:60.

[Preparation of electrode roll]

The positive-electrode plate 220 and the negative-electrode plate 230 are rolled with the separator 250 of polyethylene interposed therebetween to form the electrode roll 210 such that the one-side current collector-exposed portion of the positive-electrode plate 220 faces outward and the two-side current collector-exposed portion thereof is located on the outermost periphery of the electrode roll 210. This permits the current collector-exposed portion to come in contact with the interior surface of the battery casing, thereby providing electrical connection between the positive electrode plate and the battery casing also functioning as a positive-electrode external terminal.

The rolling-terminal portion of the electrode roll is fastened to the periphery of the electrode roll with an adhesive tape to maintain the rolled state of the electrode roll. Further, a bottom portion of the electrode roll is covered with an insulating tape.

The structure of the electrode roll 210 will be described in more detail with reference to FIG. 6.

Figure 6:
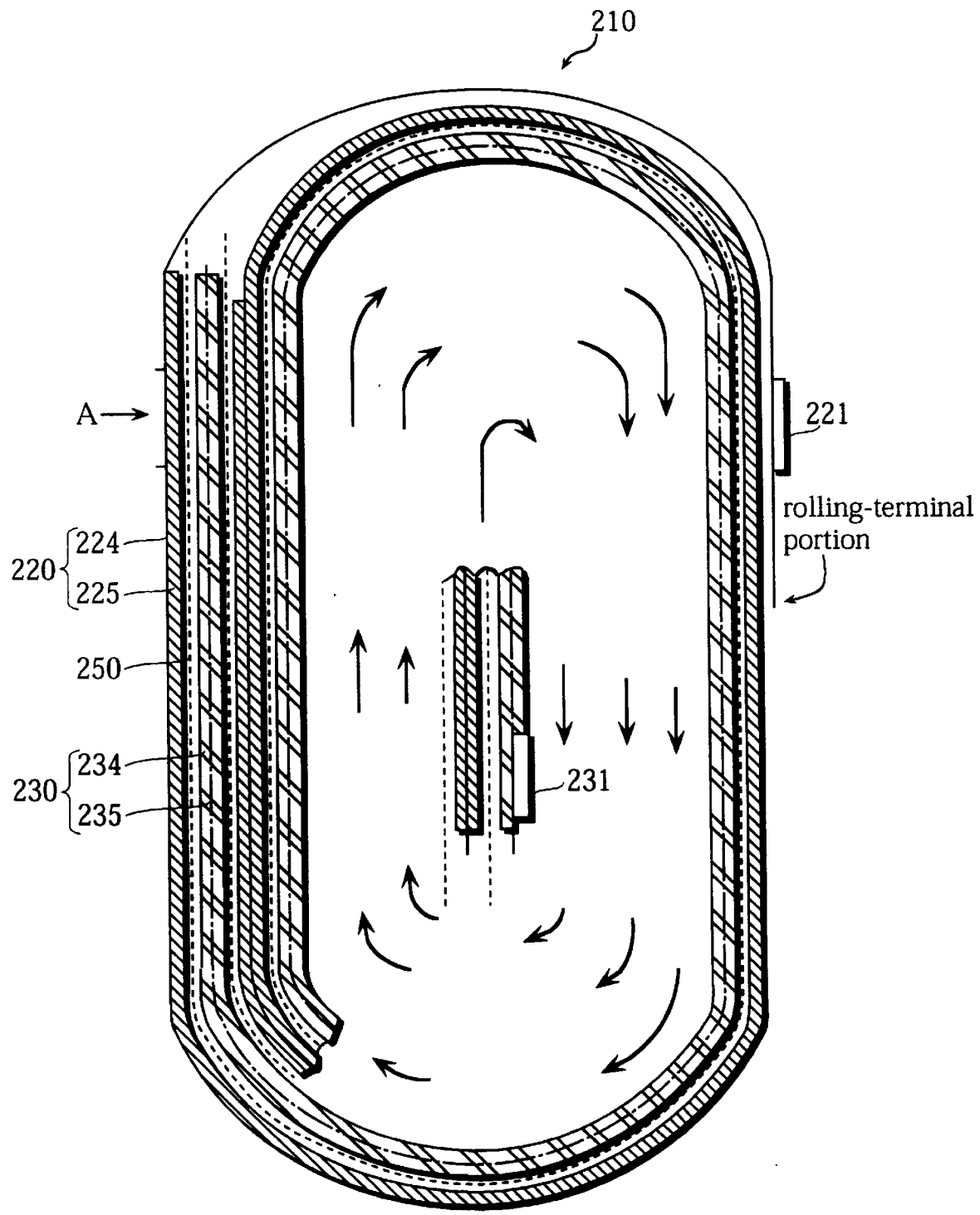
FIG. 6 is a schematic sectional view of an electrode roll of the battery A2 taken along a line X—X in FIG. 3.

FIG. 6 is a schematic sectional view of the electrode roll of the battery A2 taken along a line X—X of FIG. 3. As shown in FIG. 6, the two-side current collector-exposed portion is located on the outermost periphery of the electrode roll 210, and the one-side current collector-exposed portion underlies the two-side current collector-exposed portion. The negative-electrode collector tab 231 is located in the vicinity of the rolling-starting portion of the electrode roll, and the positive-electrode collector tab 221 is located adjacent to the rolling-terminal portion of the electrode roll. The positive-electrode collector tab 221 is formed by folding the incised portion 222 shown in FIG. 4 to the side of the sealing plate 241.

The incised portion 222 may be provided in any portion of the positive-electrode plate. For example, the incised portion 222 may be provided in a portion indicated by an arrow A, but is preferably provided in a portion of the outermost periphery of the electrode roll 210 which faces the electrode plate of the same polarity located therebelow (e.g., in a portion indicated by an arrow B in FIG. 6). As previously described, when the incision lines extending through the positive-current collector is formed, burrs are formed on a back side thereof. The burrs may cut through the separator to contact the counter electrode if it is present below the separator. In accordance with the present invention, however, the presence of the electrode of the same polarity below the incised portion prevents an internal short-circuit even if the burrs contact the electrode.

To the contrary, where the incised portion is provided in the portion indicated by the arrow A, the burrs penetrating through the separator 250 may contact the negative electrode plate 230 provided below the incised portion with the intervention of the separator. This may result in an internal short-circuit.

Although the battery A2 of Example 2 is constructed such that the collector tab formed by incising and folding a part of the positive-electrode plate is held between the sealing plate and the battery casing, the positive-electrode plate and the negative-electrode plate may be provided in a reverse positional relationship in the electrode roll so that the negative-electrode plate having a current collector-exposed portion of substantially the same construction as the aforesaid negative-electrode current collector-exposed portion is located on the outermost periphery of the electrode roll. In such a case, a negative-electrode collector tab is formed by incising and folding a part of the negative-electrode plate located on the outermost periphery of the electrode roll, and held between the sealing plate and the battery casing 200 (functioning as a negative-electrode external terminal).

[Construction of sealing plate]

For easy understanding of the battery A2 according to Example 2 of the present invention, the construction of the sealing plate 240 will be described in detail.

Figure 7A:
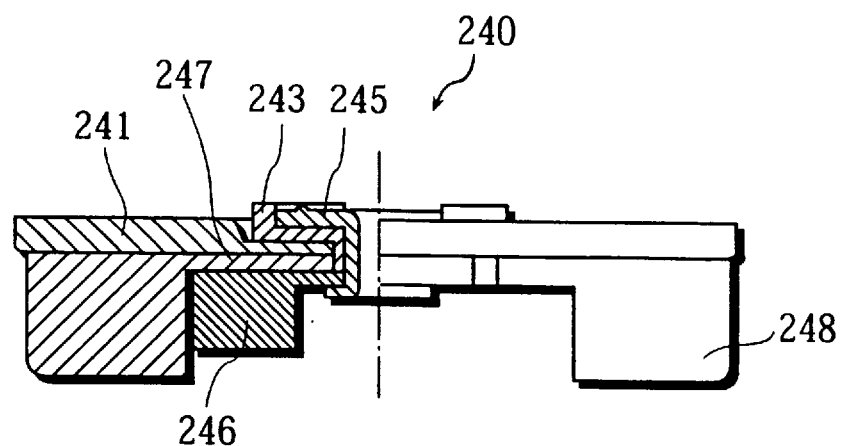
FIG. 7A is a partially sectional view of a sealing cover of the battery A2.
Figure 7B:
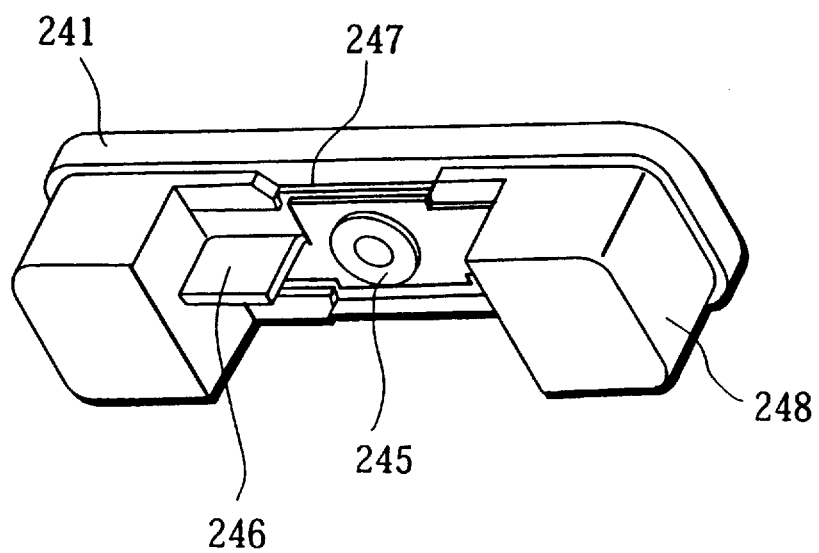
FIG. 7B is a perspective view of the sealing cover of the battery A2 as viewed at an angle from a lower side thereof.

FIG. 7A is a partially sectional side view of the sealing cover from which a battery cap 242 is removed. FIG. 7B is a perspective view of the sealing cover as viewed at an angle from a lower side thereof. The sealing cover 240 includes the sealing plate 241 having a through-hole formed in the central portion thereof, a metallic hollow cap 245 fitted in the through-hole with the intervention of an insulative gasket 243, the battery cap 242 (also functioning as a negative-electrode external terminal) electrically connected to an upper end portion of the hollow cap 245, a collector terminal plate 246 electrically connected to the hollow cap 245, and an insulating plate 247 interposed between the sealing plate 241 and the collector terminal plate 246 for electrical insulation therebetween.

Figure 13A:
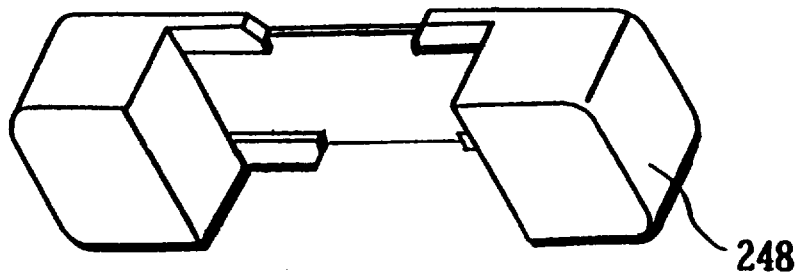
FIG. 13A is a perspective view of the spacer which is integrated with the insulating plate in the embodiment 2-1.
Figure 13B:
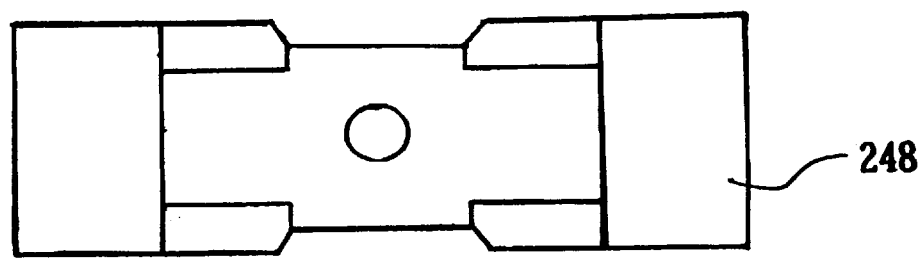
FIG. 13B is a plane view of the spacer shown in FIG. 13A.

The gasket 243, the insulating plate 247 and the collector terminal plate 246 are fixed to the sealing plate 241 by crimping the upper and lower ends of the hollow cap 245. Spacers 248 are provided on opposite ends of the insulating plate 247 and, in Example 2, molded integrally with the insulating plate 247. A perspective view of a spacer 248 having this structure when it is seen from inside the battery is shown in FIG. 13A, and its plane view is shown in FIG. 13B. The spacers 248 are disposed between the sealing plate 241 and the electrode roll 210 to support the electrode roll 210 for prevention of vertical loose movement.

As shown in FIG. 7B, a part of the collector terminal plate 246 is incised and folded downward, to which the negative-electrode collector tab 231 is electrically connected directly or via a lead.

[Fabrication of battery]

The battery A2 of Example 2 was fabricated in the following manner by using the aforesaid components.

FIG. 8 is explanatory diagrams illustrating a fabrication process for the battery A2. For easy understanding of the fabrication process, FIGS. 3, 7A and 7B are also referred.

The negative-electrode collector tab 231 was electrically connected to the collector terminal plate 246 fixed to the sealing plate 241 with the sealing plate 241 being located above the electrode roll 210. The incised portion 222 formed in the positive-current collector-exposed portion was folded to form the positive-electrode collector tab 221. A protective tape 227 was applied over the positive-electrode collector tab 221, which was thereby fastened to the periphery of the electrode roll 210.

In turn, the electrode roll 210 electrically connected to the negative-electrode collector tab 231 was inserted into the battery casing 200 of aluminum having a rectangular sectional configuration. The positive-electrode collector tab 221 formed with the positive electrode plate was extended along the interior surface of the battery casing 200 to the open end thereof. Then, the sealing cover 240 was fitted in the open end portion of the battery casing 200 with the end portion of the collector tab 221 being held between the circumference of the sealing plate 241 and the battery casing 200. Subsequently, a laser beam was applied to the portion where the sealing plate 241 was fitted in the battery casing 200 to weld the sealing plate 241 to the battery casing 200. By the laser welding, the battery was sealed and, at the same time, electrical connection between the positive-electrode collector tab 221 and the battery casing 200 was firmly established. After the laser welding, the nonaqueous electrolyte was poured into the battery casing 200 from the through-hole of the sealing plate 241, and the through-hole was capped with the battery cap 242. Thus, the battery A2 of Example 2 was completed.

The positive-electrode base used for the battery A2 has a small thickness of 20 $\mu$m. The positive-electrode collector tab 221 formed by incising and folding a part of the positive-current collector, even if interposed between the battery casing and the sealing plate, does not produce a large gap therebetween. Therefore, perfect sealing is achieved by the laser welding. Further, the 20 $\mu$m-thick positive-electrode collector tab does not interfere with the insertion of the electrode roll 210 into the battery casing.

The positive-electrode collector tab 221 preferably has a length such that the end portion thereof projects slightly from the upper face of the sealing plate. If the positive-electrode collector tab is too long, a portion thereof projecting form the upper face of the sealing plate is trimmed. The roll diameter of the electrode roll 210 is preferably preliminarily adjusted to ensure sufficient contact between the outermost periphery (positive-current collector-exposed portion) of the electrode roll 210 and the interior surface of the battery casing and smooth insertion of the electrode roll 210 into the battery casing.

Comparative Example 2

A battery B2 according to Comparative Example 2 was fabricated which had substantially the same construction as the battery A2 of Example 2, except that the electrode roll did not have the positive-electrode collector tab 221. In the battery B2, the current collection from the positive electrode is achieved only by bringing the outermost periphery of the electrode roll (positive-current collector-exposed portion) into contact with the battery casing 200.

[Experiment 2-1]

High-temperature storage characteristics of the battery A2 and the battery B2 were examined. A test for the high-temperature storage characteristics was performed in the following manner. The batteries A2 and B2 were each charged to a level equivalent to 50% of a theoretical battery capacity, and then the open-circuit voltages thereof were measured. After the batteries A2 and B2 were allowed to stand in a constant-temperature bath at 60 βC for ten days, the batteries were each connected to a 10 Ω-resistor and the closed-circuit voltages thereof were measured.

The measurement results are shown in Table 2-1.

TABLE 2-1

|  | Open-circuit voltage before storage (V) | Closed-circuit voltage after storage (V) |
| --- | --- | --- |
| Battery A2 (Ex.2) | 3.80 | 3.70 |
| Battery B2 (Com.Ex.2) | 3.80 | 3.58 |

[Experiment 2-2]

After the batteries A2 and B2 were stored under the same conditions as in Experiment 2-1, the internal resistances thereof were measured. The results are show in Table 2-2. It should be noted that a 1 kHz-AC method was employed for the measurement of the internal resistances.

TABLE 2-2

|  | Internal Resistance (mΩ) | |
| --- | --- | --- |
|  | Before storage | After storage |
| Battery A2 (Ex.2) | 79 | 95 |
| Battery B2 (Com.Ex.2) | 81 | 172 |

As is apparent from Tables 2-1 and 2-2, a decrease in the closed-circuit voltage and an increase in the internal resistance after the high-temperature storage were suppressed in the battery A2 in comparison with the battery B2. This is attributable to the difference in the current collection method between the batteries A2 and B2. More specifically, in the case of the battery B2, the current collection is achieved only by the contact between the interior surface of the battery casing and the positive-current collector-exposed portion, and the degree of the contact therebetween varies depending on the temperature of the battery. This is because, when the internal pressure of the battery is increased with the rise of the battery temperature, the battery casing expands and deforms, thereby reducing the degree of the contact between the outermost periphery of the electrode roll and the interior surface of the battery casing. This results in an increase in the internal resistance and a decrease in the closed-circuit voltage, To the contrary, the battery A2 offers a satisfactory current collection performance even if the degree of the contact is reduced due to the expansion of the battery casing, because the connection between the positive-electrode collector tab and the battery casing is firmly established. Therefore, the battery A2 does not suffer from a decrease in the closed-circuit voltage and an increase in the internal resistance due to an electrical connection failure.

Example 3

A battery A3 according to Example 3 was fabricated in substantially the same manner as the battery A2 of Example 2, except that the spacer molded integrally with the insulating plate had a different configuration.

Figure 9A:
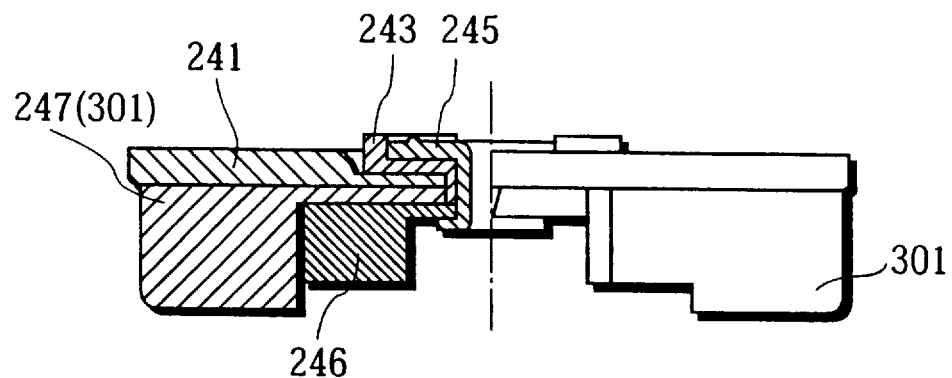
FIG. 9A is a partially sectional view of a sealing cover of a battery A3 according to the present invention.
Figure 9B:
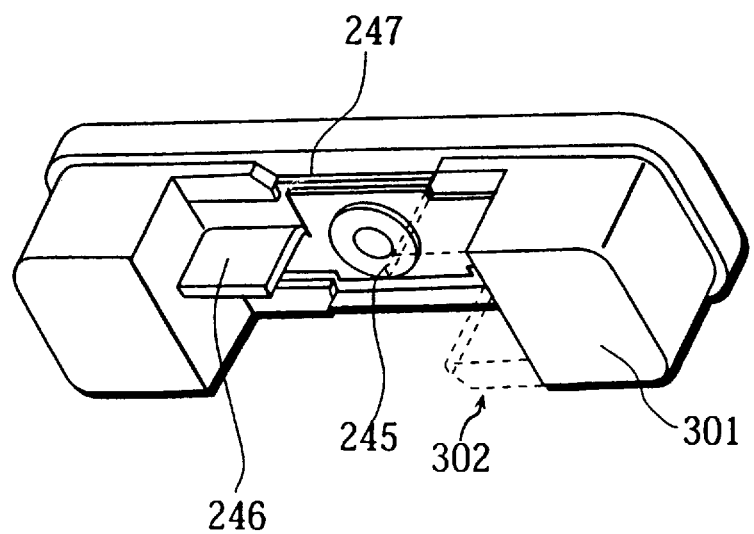
FIG. 9B is a perspective view of the sealing cover of the battery A3 as viewed at an angle from a lower side thereof.

FIG. 9A is a partially sectional view of a sealing cover, and FIG. 9B is a perspective view of the sealing cover as viewed at an angle from a lower side thereof. The battery A4 has the sealing cover shown in FIGS. 9A and 9B. The sealing cover includes spacers molded integrally with the insulating plate and having a wall portion. The construction of the spacers of the battery A3 will be detailed with FIGS. 14A, 14B, 9A, and 9B.

Figure 10:
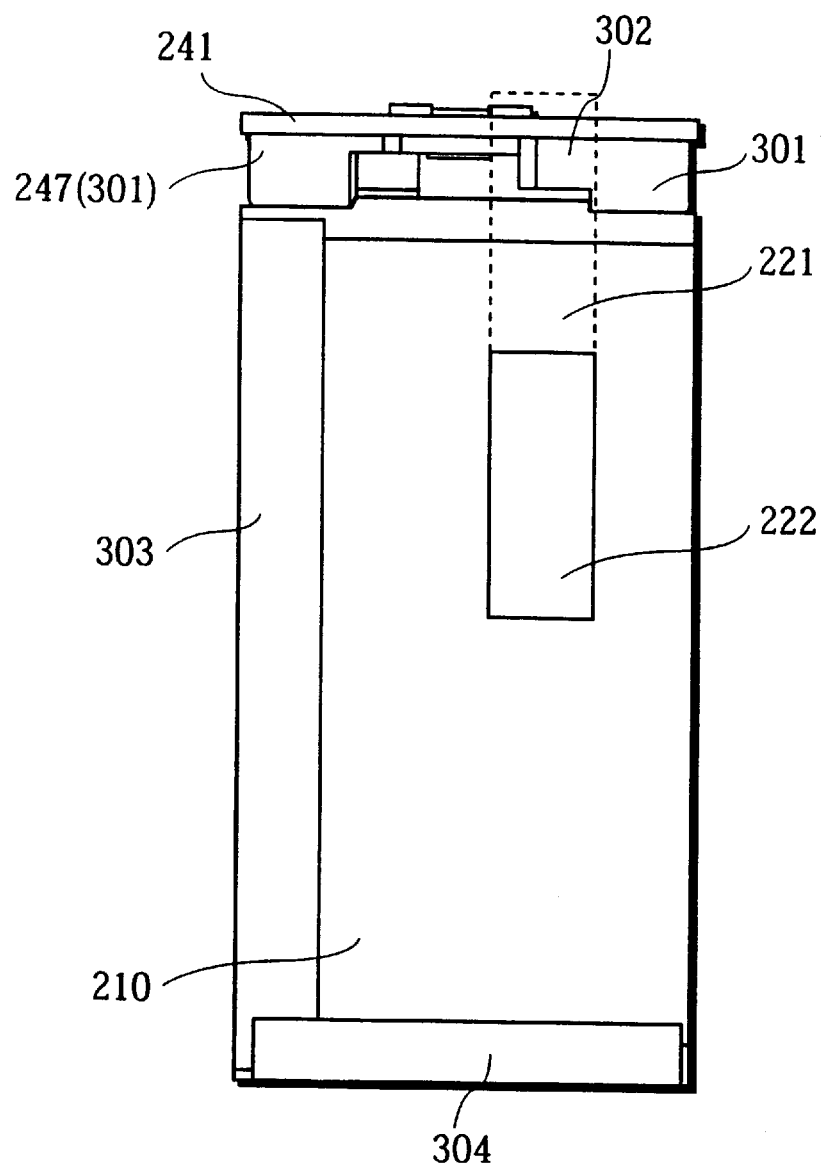
FIG. 10 is a perspective view illustrating the battery A3.
Figure 14A:
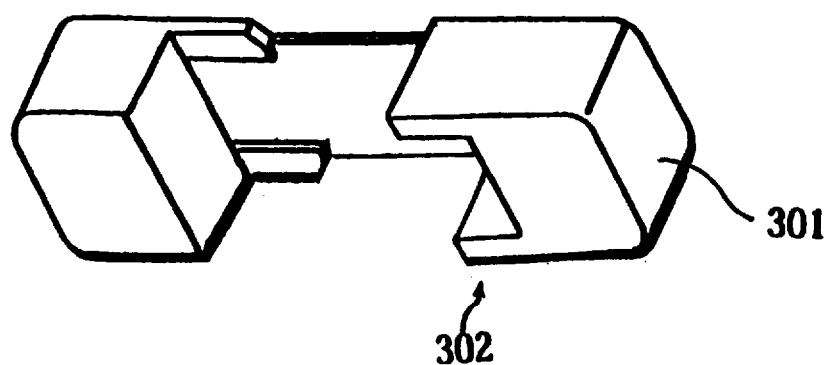
FIG. 14A is a perspective view of the spacer having a wall portion of the battery A3 of the present invention.
Figure 14B:
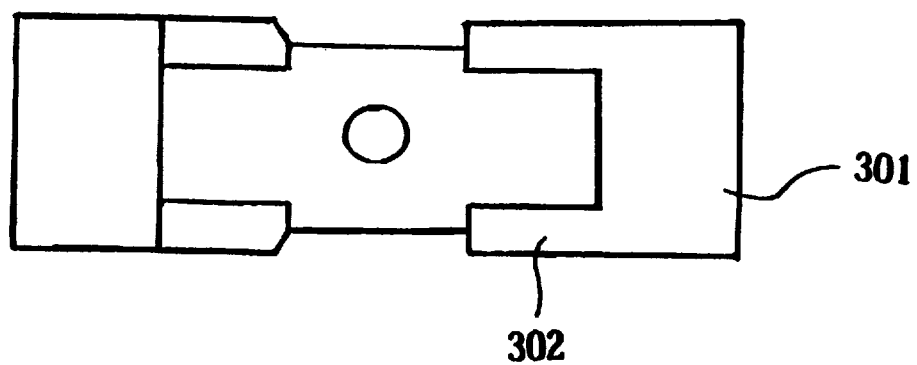
FIG. 14B is a plane view of the spacer shown in FIG. 14A.

FIG. 14A is a perspective view illustrating the entire appearance of the spacer, and FIG. 14B is a plane view of the spacer when it is seen from inside of the battery. For easy understanding of the difference between the sealing covers shown in FIGS. 7B and 9B, the wall portion 302 is depicted by a dotted line in FIG. 9B. The wall portion 302 is adapted to prevent the positive-electrode collector tab 221 (formed by folding the incised portion 222) formed with the positive-current collector-exposed portion on the outermost periphery of the electrode roll 210 from contacting the collector terminal plate 246 having a different polarity. The wall portion is provided on a side where the positive-electrode collector tab 221 is located. The positive-electrode collector tab 221 is extended between the outer surface of the wall portion 302 and the interior surface of the battery casing to the circumference of the sealing plate 241 (or to the open end of the battery casing), and held in the welded portion between the sealing plate and the battery casing. FIG. 10 is an explanatory diagram illustrating the positional relationship between the positive-electrode collector tab 221, the wall portion 302 and the sealing plate 241. In FIG. 10, there are also shown a tape 303 for fastening the rolling-terminal portion to the electrode roll and an insulating tape 304 for covering the bottom of the electrode roll.

In the battery A3 of the aforesaid construction, the wall portion 302 prevents the collector tab from being brought in electrical contact with members having a different polarity such as the collector terminal plate and the lead formed with the collector terminal plate. Therefore, the incidence of short-circuits within the battery is reduced.

Example 4

A battery A4 according to Example 4 was fabricated in substantially the same manner as the battery A2 of Example 2, except that the incised portion had a different configuration.

Figure 11:
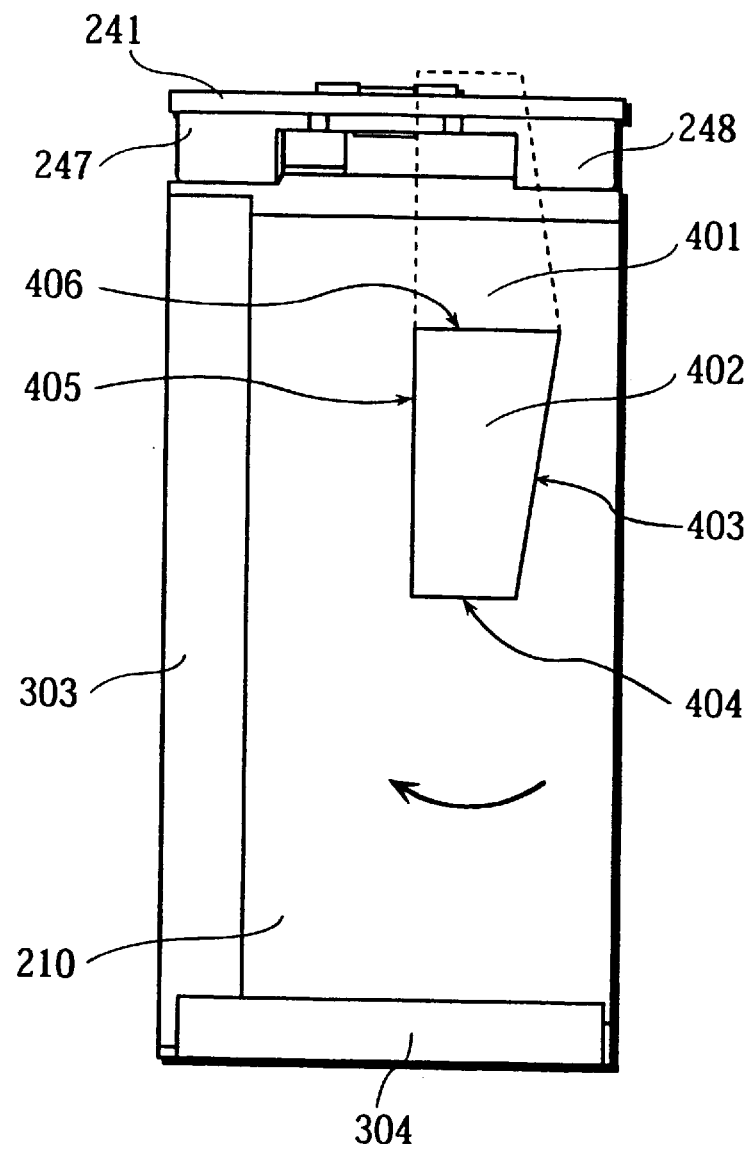
FIG. 11 is a perspective view illustrating a battery A4 according to the present invention.

FIG. 11 is an explanatory diagram illustrating the construction of a positive-electrode collector tab 401. As shown in FIG. 11, an incised portion 402 formed in the positive-current collector-exposed portion is defined by an incision line 403 located on the side of the rolling-starting end of the electrode roll, an incision line 405 opposing the incision line 403, an incision line 404 extending from one end of the incision line 403 to one end of the incision line 405, and a non-incision line 406 extending from the other end of the incision line 403 to the other end of the incision line 405. The positive-electrode collector tab 401 is formed by folding the incised portion 402 defined by the incision lines 403, 404 and 405 to the side of the sealing plate 241 along a folding line of the non-incision line 406.

The incision line 404 is generally parallel to the rolling direction of the electrode roll 210, and the incision line 405 is generally parallel to a direction perpendicular to the rolling direction. The incision line 403 extending from a starting point of the intersection of the non-incision line 406 and the incision line 403 to an end point of the intersection of the incision line 404 and the incision line 403 is inclined to the rolling direction.

By inclining the incision line 403 to the rolling direction of the electrode roll, the following effect is provided. The positive-electrode collector tab formed by folding the incised portion of the positive electrode plate is liable to be raised because of a counter force against the folding. The counter force is enhanced when the positive-electrode plate is rolled up, making the collector tab more liable to be raised. An edge of the collector tab 401 corresponding to the incision line 403 is subjected to the roll-up of the electrode plates earlier than the other edges of the collector tab. Since the edge corresponding to the incision line 403 is inclined to the rolling direction from the folding line 406, the proximal portion of the collector tab with a relatively small raise can be first rolled up for the formation of the electrode roll. This facilitates the roll-up of the electrode plates, thereby reducing the deformation of the collector tab.

Example 5

Figure 12:
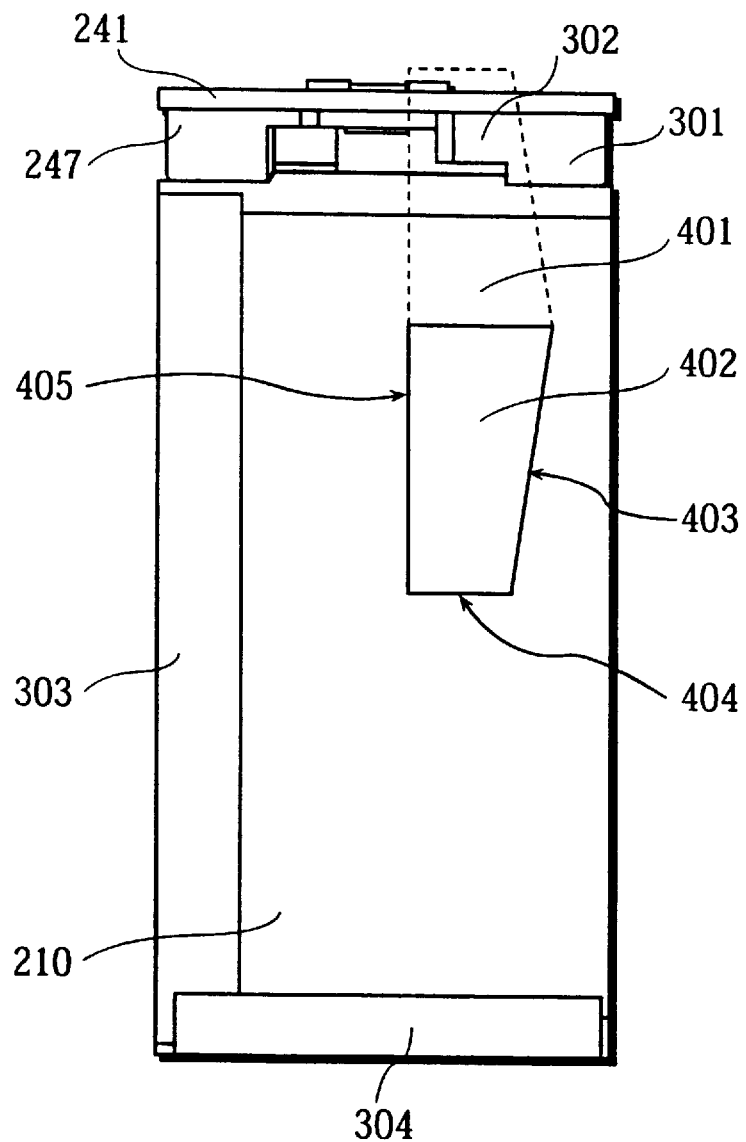
FIG. 12 is a perspective view illustrating a battery A5 according to the present invention.

A battery A5 according to Example 5 was fabricated in substantially the same manner as the battery A2 of Example 2, except that the incised portion has the same construction as that of Example 4 and the spacer has the same construction as that of Example 3. The constructions of the positive-electrode collector tab 401 and the spacer 301 and the positional relationship therebetween are shown in FIG. 12.

[Experiment 3-1]

A drop shock test was performed to examine the incidence of internal short-circuits in the batteries A2, A3, A4 and A5. In the test, the batteries A2, A3, A4 and A5 were each dropped from a height of 1.5 m onto a plastic floor tile (P-tile) with the battery cap thereof oriented downward and, thereafter, the battery voltage was measured. The number of samples for each battery was 50. The results are shown in Table 3-1.

TABLE 3-1

|  | Internal short-circuit (%) |
| --- | --- |
| Battery A2 (Ex. 2) | 40 |
| Battery A3 (Ex. 3) | 0 |
| Battery A4 (Ex. 4) | 40 |
| Battery A5 (Ex. 5) | 0 |

As is apparent from Table 3-1, the batteries A3 and A5 each employing the spacer with the wall portion were less liable to the internal short-circuit due to the drop shock than the batteries A2 and A4 each employing the spacer without the wall portion. Therefore, the spacer with the wall portion is effective for the prevention of the contact between the members having different polarities (particularly, the contact between the positive-electrode collector tab and the negative-electrode collector terminal plate).

[Experiment 3-2]

The deformation of the positive-electrode collector tab after the formation of the electrode roll was examined for the batteries A2, A3, A4 and A5 (50 batteries for each). The results are shown as the incidence of appearance defectives in Table 3-2.

TABLE 3-2

|  | Appearance defective (%) |
| --- | --- |
| Battery A2 (Ex. 2) | 8 |
| Battery A3 (Ex. 3) | 8 |
| Battery A4 (Ex. 4) | 0 |
| Battery A5 (Ex. 5) | 0 |

As is apparent from Table 3-2, the batteries A4 and A5 (in which the edge 403 of the collector tab to be rolled up earlier for the formation of the electrode roll was inclined to the rolling direction) exhibited a reduced incidence of appearance defectives in comparison with the batteries A2 and A3 (in which the opposite edges of the collector tab were parallel to each other and (each extended perpendicular to the rolling direction). Therefore, the deformation of the collector tab at the roll-up of the electrode plates can be prevented by inclining the edge of the collector tab on the side of the rolling-starting end of the electrode plate.

What is claimed is:

1. A battery comprising:
   a battery casing having a hollow body with a bottom and an opening;
   a sealing cover having a sealing plate laser-welded to the opening of the battery casing so as to seal the opening;
   an electrode member accommodated in the battery casing, and including a positive-electrode plate having a conductive current collector retaining a positive-electrode active material, a negative electrode plate having a conductive current collector retaining a negative-electrode active material and a separator interposed between the positive-electrode plate and the negative-electrode plate;
   an electrolyte;
   a first collector tab which is united with a first electrode plate serving as either one of the positive-electrode plate and the negative electrode plate and which is interposed between an interior surface of the battery casing and a circumference of the sealing plate; and
   an end of the opening of the battery casing, the first collector tab, and the circumference of the sealing plate being united by laser welding whereby the first collector tab is electrically connected to the battery casing.

2. A battery as set forth in claim 1,
   wherein the electrode member is an electrode roll which is formed by rolling the positive-electrode plate and the negative-electrode plate into a spiral configuration with the separator interposed therebetween, and
   wherein the first electrode plate is at an outermost position when the electrode roll is rolled, and at least a surface of the first electrode plate which faces the interior surface of the battery casing includes a current collector-exposed portion which retains no active material and from which the first collector tab is formed.

3. A battery as set forth in claim 2,
   wherein the first collector tab is a portion of the current collector-exposed portion, formed by incising the current collector-exposed portion and folding the incised portion toward the sealing plate.

4. A battery as set forth in claim 3,
   wherein all or a part of the current collector-exposed portion is brought in contact with the interior surface of the battery casing.

5. A battery as set forth in claim 3,
   wherein the electrode adjacent to the incised portion, with or without intervention of the separator, is the first electrode plate, and has or does not have active material.

6. A battery as set forth in claim 3,
   wherein the incised portion has a U-shaped configuration.

7. A battery as set forth in claim 3,
   wherein the battery casing and the current collector of the first electrode plate are each formed of aluminum or an aluminum alloy.

8. A battery as set forth in claim 3,
   wherein the electrode roll has an elliptical configuration except a circle in section taken along a line perpendicular to a roll axis of the electrode roll.

9. A battery as set forth in claim 8,
   wherein the battery casing has a rectangular or elliptical configuration in open end section.

10. A battery as set forth in claim 5, wherein the incised portion is defined by at least two opposing incision lines and a folding line defined between ends of the two incision lines on the side of the sealing plate and extending generally parallel to a rolling direction of the electrode roll, one of the two incision lines on a side to be first rolled up for the formation of the electrode roll being inclined to a rolling direction of the electrode roll from an intersection of said one incision line and the folding line.

11. A battery as set forth in claim 10, wherein the battery casing and the current collector of the first electrode plate are each formed of aluminum or an aluminum alloy.

12. A battery as set forth in claim 10, wherein the electrode roll has an elliptical configuration except a circle in section taken along a line perpendicular to a roll axis of the electrode roll.

13. A battery as set forth in claim 10, wherein the battery casing has a rectangular or elliptical configuration in open end section.

14. A battery as set forth in claim 1, wherein the sealing cover includes the sealing plate, an insulating plate disposed on a surface of the sealing plate, a collector terminal plate disposed on a surface of the insulating plate such that the insulating plate is disposed between the sealing plate and the collector terminal plate and has a polarity different from that of the first electrode plate, and a spacer molded integrally with the insulating plate, the spacer having a wall portion for preventing the first collector tab from being brought into electrical contact with members having the polarity different from that of the first collector tab.

15. A battery as set forth in claim 2, wherein the sealing cover includes the sealing plate, an insulating plate disposed on a surface of the sealing plate, a collector terminal plate disposed on a surface of the insulating plate such that the insulating plate is disposed between the sealing plate and the collector terminal plate and has a polarity different from that of the first electrode plate, and a spacer molded integrally with the insulating plate, the spacer having a wall portion for preventing the first collector tab from being brought into electrical contact with members having the polarity different from that of the first collector tab.

16. A battery as set forth in claim 3, wherein the sealing cover includes the sealing plate, an insulating plate disposed on a surface of the sealing plate, a collector terminal plate disposed on a surface of the insulating plate such that the insulating plate is disposed between the sealing plate and the collector terminal plate and has a polarity different from that of the first electrode plate, and a spacer molded integrally with the insulating plate, the spacer having a wall portion for preventing the first collector tab from being brought into electrical contact with members having the polarity different from that of the first collector tab.

17. A battery as set forth in claim 4, wherein the sealing cover includes the sealing plate, an insulating plate disposed on a surface of the sealing plate, a collector terminal plate disposed on a surface of the insulating plate such that the insulating plate is disposed between the sealing plate and the collector terminal plate and has a polarity different from that of the first electrode plate, and a spacer molded integrally with the insulating plate, the spacer having a wall portion for preventing the first collector tab from being brought into electrical contact with members having the polarity different from that of the first collector tab.

18. A battery as set forth in claim 5, wherein the sealing cover includes the sealing plate, an insulating plate disposed on a surface of the sealing plate, a collector terminal plate disposed on a surface of the insulating plate such that the insulating plate is disposed between the sealing plate and the collector terminal plate and has a polarity different from that of the first electrode plate, and a spacer molded integrally with the insulating plate, the spacer having a wall portion for preventing the first collector tab from being brought into electrical contact with members having the polarity different from that of the first collector tab.

19. A battery as set forth in claim 6, wherein the sealing cover includes the sealing plate, an insulating plate disposed on a surface of the sealing plate, a collector terminal plate disposed on a surface of the insulating plate such that the insulating plate is disposed between the sealing plate and the collector terminal plate and has a polarity different from that of the first electrode plate, and a spacer molded integrally with the insulating plate, the spacer having a wall portion for preventing the first collector tab from being brought into electrical contact with members having the polarity different from that of the first collector tab.

20. A battery as set forth in claim 7, wherein the sealing cover includes the sealing plate, an insulating plate disposed on a surface of the sealing plate, a collector terminal plate disposed on a surface of the insulating plate such that the insulating plate is disposed between the sealing plate and the collector terminal plate and has a polarity different form that of the first electrode plate, and a spacer molded integrally with the insulating plate, the spacer having a wall portion for preventing the first collector tab from being brought into electrical contact with members having the polarity different form that of the first collector tab.

21. A battery as set forth in claim 8, wherein the sealing cover includes the sealing plate, an insulating plate disposed on a surface of the sealing plate, a collector terminal plate disposed on a surface of the insulating plate such that the insulating plate is disposed between the sealing plate and the collector terminal plate and has a polarity different from that of the first electrode plate, and a spacer molded integrally with the insulating plate, the spacer having a wall portion for preventing the first collector tab from being brought into electrical contact with members having the polarity different from that of the first collector tab.

22. A battery as set forth in claim 9, wherein the sealing cover includes the sealing plate, an insulating plate disposed on a surface of the sealing plate, a collector terminal plate disposed on a surface of the insulating plate such that the insulating plate is disposed between the sealing plate and the collector terminal plate and has a polarity different from that of the first electrode plate, and a spacer molded integrally with the insulating plate, the spacer having a wall portion for preventing the first collector tab from being brought into electrical contact with members having the polarity different form that of the first collector tab.

23. A battery as set forth in claim 10, wherein the sealing cover includes the sealing plate, an insulating plate disposed on a surface of the sealing plate, a collector terminal plate disposed on a surface of the insulating plate such that the insulating plate is disposed between the sealing plate and the collector terminal plate and has a polarity different from that of the first electrode plate, and a spacer molded integrally with the insulating plate, the spacer having a wall portion for preventing the first collector tab from being brought into electrical contact with members having the polarity different from that of the first collector tab.

24. A battery as set forth in claim 11, wherein the sealing cover includes the sealing plate, an insulating plate disposed on a surface of the sealing plate, a collector terminal plate disposed on a surface of the insulating plate such that the insulating plate is disposed between the sealing plate and the collector terminal plate and has a polarity different from that of the first electrode plate, and a spacer molded integrally with the insulating plate, the spacer having a wall portion for preventing the first collector tab from being brought into electrical contact with members having the polarity different from that of the first collector tab.

25. A battery as set forth in claim 12, wherein the sealing cover includes the sealing plate, an insulating plated disposed on a surface of the sealing plate, a collector terminal plate disposed on a surface of the insulating plate such that the insulating plate is disposed between the sealing plate and the collector terminal plate and has a polarity different from that of the first electrode plate, and a spacer molded integrally with the insulating plate, the spacer having a wall portion for preventing the first collector tab from being brought into electrical contact with members having the polarity different from that of the first collector tab.

26. A battery as set forth in claim 18, wherein the sealing cover includes the sealing plate, an insulating plate disposed on a surface of the sealing plate, a collector terminal plate disposed on a surface of the insulating plate such that the insulating plate is disposed between the sealing plate and the collector terminal plate and has a polarity different from that of the first electrode plate, and a spacer molded integrally with the insulating plate, the spacer having a wall portion for preventing the first collector tab from being brought into electrical contact with members having the polarity different from that of the first collector tab.

* * * * *